March 6, 1934. W. O. AWA ET AL 1,949,642
FRUIT PITTING MACHINE
Filed Nov. 12, 1930  4 Sheets-Sheet 4
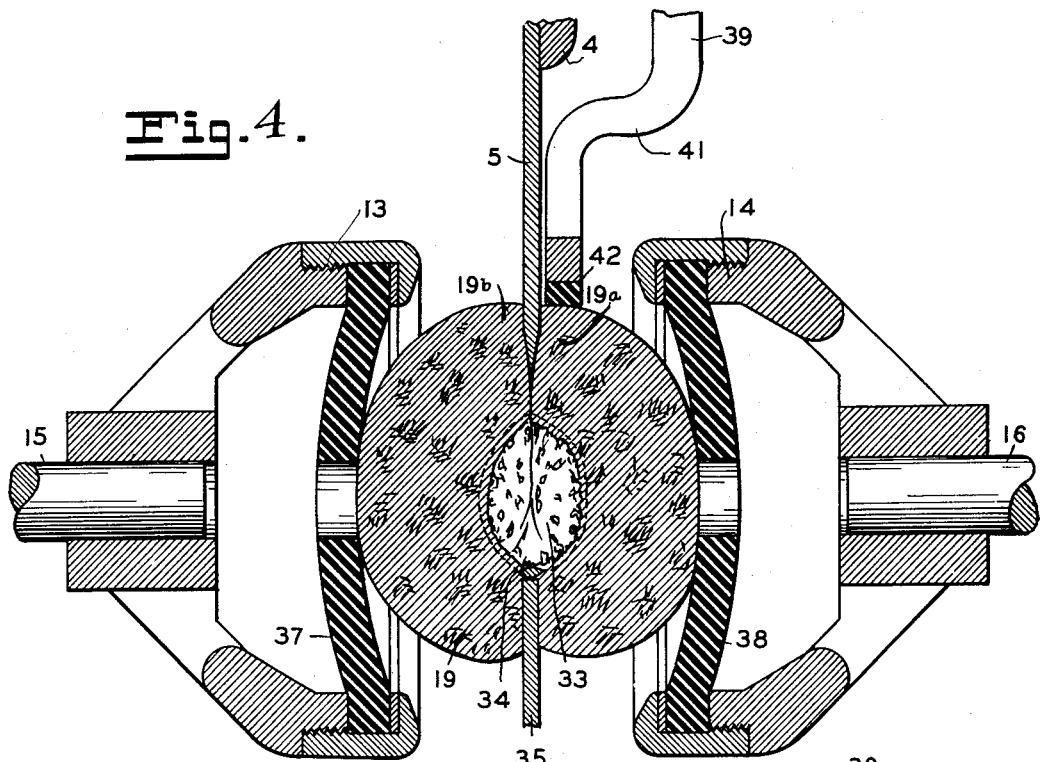
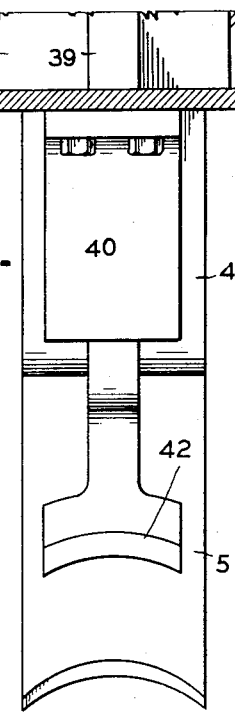
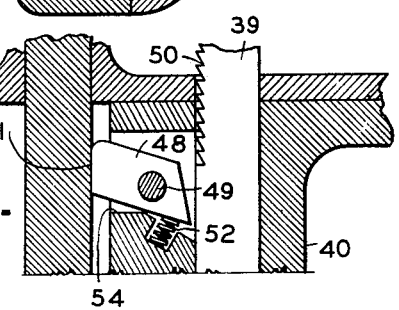
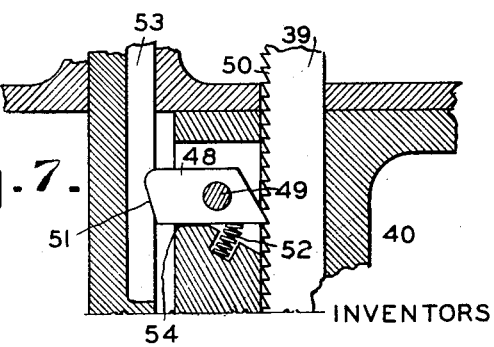
INVENTORS
WILLIAM O. AWA
CHARLES KLEMME
BY
ATTORNEY Patented Mar. 6, 1934

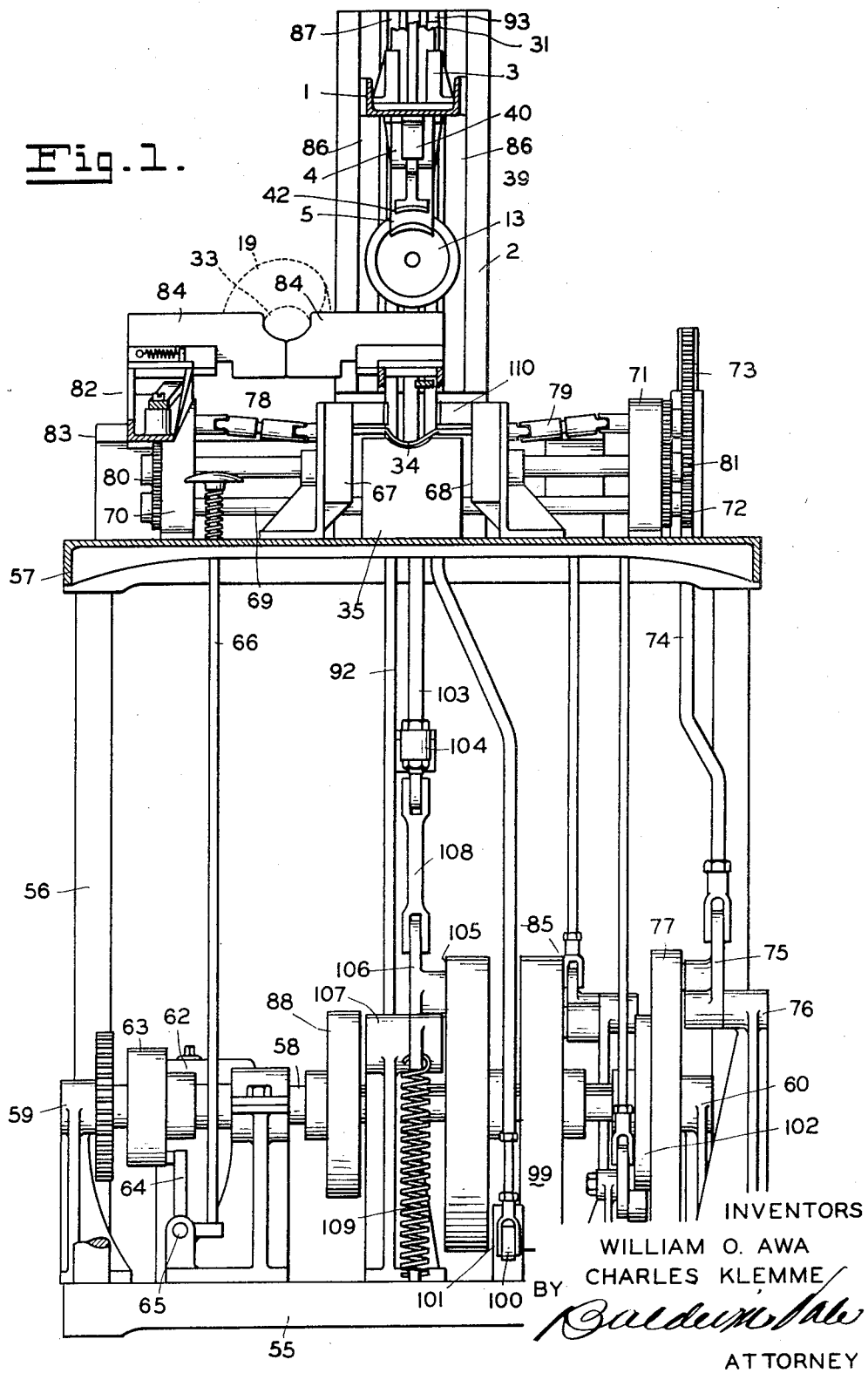

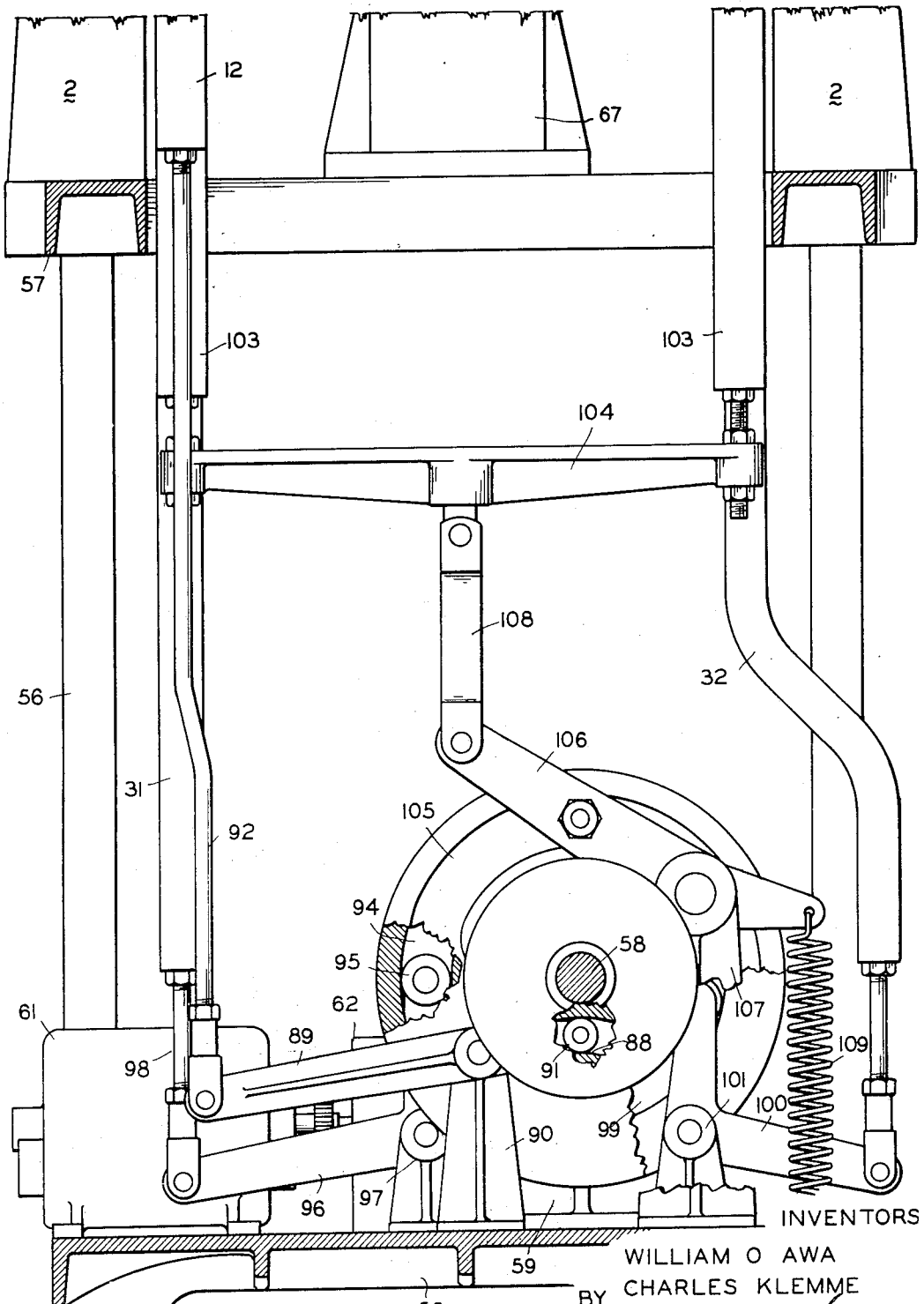

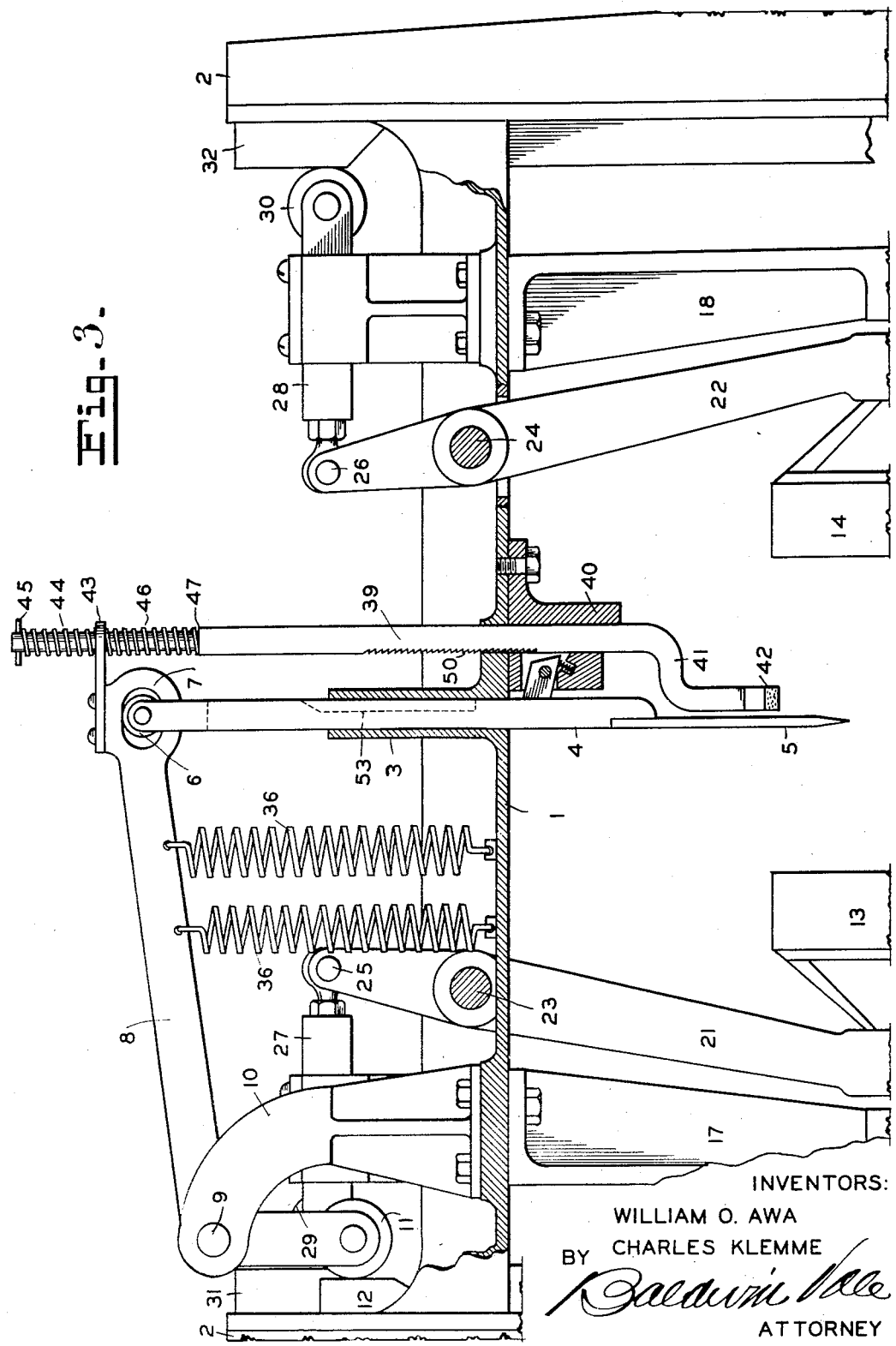

1,949,642

UNITED STATES PATENT OFFICE 1,949,642

FRUIT PITTING MACHINE

William O. Awa and Charles Klemme, San Francisco, Calif.

Application November 12, 1930, Serial No. 495,107

6 Claims. (Cl. 146—28)

This invention relates to improvements in fruit pitting machines, and more particularly to the means for holding and incising the fruit and removing the pit therefrom.

The principal object of the invention is to hold the fruit against upward and lateral displacement during the upward stroke of the pitting blade.

Another object is to automatically adjust the holding means to variations in the size of the fruit.

A further object is to construct and arrange the fruit holder so that it may be combined with any fruit pitting machine using a rotary pitting knife.

Other objects and advantages will appear as the description progresses.

The present invention is illustrated as an attachment to a fruit pitting machine disclosed in our copending application for patent entitled Fruit pitting machine, filed April 29, 1930, and bearing Serial Number 448,336, referred to for further particulars.

In the specification and the accompanying drawings the invention is disclosed in its preferred form. But it is to be understood that it is not limited to this form because it may be embodied in other forms. It is also to be understood that in and by the claims following the description it is desired to cover the invention in whatsoever form it may be embodied.

In the four sheets of drawings:

Fig. 1 is a front elevation partly in vertical section of a fruit pitting machine having this invention combined therewith.

Fig. 2 is a side elevation, partly in vertical section, of the lower portion of the machine showing the driving and timing mechanism.

Fig. 3 is a similar view of the upper portion of the machine showing the means for holding and incising the fruit.

Fig. 4 is an enlarged fragmentary detail in vertical section of the means for holding the fruit during the pitting operation.

Fig. 5 is a side elevation of the slicing blade with the presser foot combined therewith.

Fig. 6 is a vertical section of the blade guide showing the ratchet rack and pawl adjustment of the presser foot showing the pawl disengaged.

Fig. 7 is a similar view showing the pawl engaged in the rack.

In detail, the construction illustrated in the drawings, referring more particularly to Figs. 1 and 2, consists of the main frame comprising the base 55 having the pillars 56 extending thereabove and supporting the bed 57.

The cam shaft 58 is mounted at each end in the suitable bearings 59 and 60 which are bolted to the base 55. This shaft is driven by the motor 61 through the reduction gearing within the casing 62. The gearing at 62 is arranged to time the cam shaft at about 40 R. P. M.

A conventional clutch is provided at 63 to disengage the cam shaft 58 from the motor 61 when desired. The trip 64 is pivoted at 65 and is controlled by the manually operated plunger 66 to disengage the clutch. The clutch can be arranged to stop the cam shaft at a predetermined point in its rotation.

The major operation of pitting the fruit is accomplished by the curved blade 34, see Figs. 1 and 4, which has its ends mounted in the standards 67 and 68. The drive shaft 69 is mounted in the outer standards 70 and 71 and extends across the bed 57. It is offset with respect to the vertical centers of the standards and the blade 34.

The driven pinion 72 is fixed on the shaft 69 and is enmeshed with the rack 73 on the push rod 74. The lower end of the push rod 74 is connected to the lever 75 which is mounted on the bracket 76. The lever 75 has a roller thereon extending laterally into the grooved cam 77 fixed on the cam shaft 58.

The rack 73 makes one complete reciprocation with each revolution of the cam 77. The groove of the cam 77 has a concentric portion in its contour which causes an inactive interval in the operation of the drive shaft 69 to synchronize with the feeding mechanism as will hereinafter appear.

The ends of the pitting blade 34 are engaged by the flexible shafts 78 and 79 which also extend through the outer standards 70 and 71. These flexible shafts are each driven by the drive shaft 69 through the interposed gear trains 80 and 81. The axis of the pitting blade may be raised and lowered during its revolution to produce an elliptical orbit as disclosed in our copending application Serial No. 448,366, filed April 29, 1930.

The upstanding plate 35 is fixed on the bed 57 beneath the blade 34. Each revolution of the cam 77 accomplishes one revolution and reverse of the blade 34 so that it always comes to rest in longitudinal alinement with the top of the plate 35. The top edge of this plate is contoured to the curve of the blade 30 so that the down thrust of the fruit pit will not distort the blade at the instant of its revolution.

The mechanism for feeding and splitting the lower half of the fruit includes a rectangular feed carriage 82 which is transversely guided on rails such as 83 supported on suitable brackets. The coacting blades 84—84 are slidably mounted on the carriage 82. The adjoining top edges of the blades are cut away to form a semicircular gap of the approximate shape of the lower half of a peach pit.

The peach 19, to be pitted, is impaled on the blades 84—84 by the operator. The cam 85, mounted on the cam shaft 58, through suitable interposed mechanism, moves the feed carriage and peach impaled thereon laterally above the pitting blade 34.

The overhead cross beam 1 is guided in the slots 86—86 in the side brackets 2—2 which are fixed on the bed 57. The plunger guide 3 is formed on the beam 1 to vertically guide the plunger 4 having the cutting blade 5 fixed to its lower end.

The upper end of this plunger is formed into a yoke and has the antifriction roller 6 mounted therein to engage the slotted end 7 of the bell crank lever 8. This lever is pivoted at 9 in the bracket 10 fixed on the beam 1. The lower end of the bell crank has the roller 11 thereon. The cam 12 slidable in the groove 87 in the bracket 2 engages the roller 11 to actuate the bell crank 8 and thrust the blade 34 down to split the upper portion of the fruit impaled on the blades 84—84.

The grooved cam 88 is fixed on the cam shaft 58. The lever 84 is pivoted on the bracket 90 and has a roller 91 confined in the groove of the cam 88. The push rod 92 connects the lever 89 to the lower end of the cam 12. The cam 12 is thus timed by the cam 88 to depress the blade 5 in synchronism with the feeding of the peach by the carriage 82.

Subsequently to the operation of the blade 5, the fruit clamps 13 and 14, guided on the pin studs 15 and 16 respectively fixed on the brackets 17 and 18 on the beam 1, move forward to grasp the fruit 19. These clamps are respectively operated by the arms 21 and 22 fulcrumed at 23 and 24 and pivoted at 25 and 26 to the slides 27 and 28 having the rollers 29 and 30 engaging the cams 31 and 32 slidable in the grooves 93 in their respective brackets 2—2. The cam 31 is operated by the bell crank 96 which is pivoted on the bracket 97 and has the roller 95 confined in the groove of the cam 94. The rod 98 connects the bell crank 96 to the lower end of the cam 31 to operate the clamp 13. The clamp 14 is similarly operated by the grooved cam 99 actuating the lever 100 pivoted at 101 and connected to the cam 32.

The crossbeam 1 is supported by the arms 103—103 extending downwardly therefrom and joined together at their lower ends by the beam 104. The grooved cam 105 is mounted on the cam shaft 58 and drives the lever 106 which is pivoted on the bracket 107 and connected to the beam 104 by the link 108. The spring 109 contracting between the end of the lever 106 and the base 55 serves to counterbalance the weight of the cross beam 1.

When the blade 5 has descended and sliced the fruit 19, the coacting blades 84—84 are separated by suitable mechanism obvious to those skilled in the art. The mechanism illustrated in our copending application, Serial No. 448,366, filed April 29, 1930, will serve this purpose.

The cam 104 then causes the beam 1 to decend. The blade 5 descending therewith engages the pit 33 and forces the fruit 19 downward until the pit rests upon the curved blade 34. The vertical knives 110 guide the fruit in its downward movement. The upstanding plate 35 relieves the blade 34 of the impact of the descending pit 33. The fruit 19 is firmly held between the clamps 13 and 14. The resilient cushions 37 and 38 prevent injury to the fruit.

Synchronously with the gripping of the pit 33, as described, the blade 34 is rotated in an orbit around the pit (see dotted line) entirely severing the pit from the surrounding meat. When the blade 34 has reached the top of its cut, the clamp 14 backs away, releasing the half of the fruit thus severed from the pit, permitting it to drop. When the stroke of the blade 34 is completed, the clamp 13 backs away, releasing the other half of the fruit, and the beam 1 returns to the position shown in Figs. 1 and 3 ready to repeat the operation.

It is necessary for the blade 5 to recede slightly after completing its severing downward stroke, to permit the passage of the blade 34, see Fig. 2. This leaves the pit 33 unclamped during the completion of the upper stroke of the blade 34. The severed half 19a, tends to rise in the clamp 14, being pushed up by the blade 34, so that the half 19a is not completely or cleanly severed from the other half 19b. This leaves a fin or burr on the part 19a which is objectionable to the canning trade.

It is the primary object of this invention to hold down the fruit during the upward cut of the pitting blade. This is accomplished by the plunger 39 guided in the block 40, fixed to the beam 1 and provided with a cushion foot. The plunger is offset at 41 to bring the foot 42 in proximity to the side of the blade 5.

The upper end of the plunger is guided in the extension 43, on the end of the bell crank 8. The spring 44 encircles the plunger end between the pin 45 and the extension 43. A similar spring 46 extends between the extension 43 and the shoulder 47 on the plunger.

The pawl 48 is pivoted within the block 40 on the transverse pin 49, see Figs. 4, 5. The nose of the pawl is sharpened to engage in the ratchet teeth 50 forming a rack in the side of the plunger 39. The tail 51 of the pawl normally rests against the side of the plunger 4 and is thereby held out of engagement with the ratchet teeth 50, against the expansion of the spring 52. The plunger 4 is slotted at 53, in the path of the tail of the pawl. When the tail 51 drops into this slot 53, the pawl head is elevated by the spring 52 and can engage the teeth 50, while the tail 51 is stopped against the shoulder 54, to prevent the rise of the plunger 39.

When the plunger 4 descends, as previously described, the extension 43 also pushes the plunger 39 downward until the foot 42 rests upon the fruit 19a, the spring 46 yielding to permit the further descent of the blade 5 to clamp the pit 33, without putting undue pressure upon the fruit 19a, see Fig. 2.

When the blade 5 has completed its descent the slot 53 registers with the tail 51 of the pawl, permitting the pawl to engage the alined tooth in the rack formed on the plunger 39. This locks the foot 42 against the fruit 19a, automatically setting the foot according to the diameter of the fruit 19, which position is maintained by the pawl tail 51 locking against the shoulder 54.

The foot 42 thus opposes the upthrust of the blade 34. The initial ascent of the blade 5 to clear the blade 34, compresses the spring 44 without releasing the pawl 48. When the half 19a of the fruit is released by the clamp 14, the compressed spring 46 shoots the plunger 39 downward, resetting the foot 42 with respect to the edge of the blade 5, see Fig. 1, ready to repeat the operation. When the beam 1 rises, the roller 11 engages the cam 12, lifting the plunger 4, compressing the spring 44, which pulls the pawl out of engagement with the rack teeth 50.

Having thus described this invention what we claim and desire to secure by Letters Patent is:

1. In a fruit pitting machine having a rotary pitting blade, fruit clamping means mounted on opposite sides of said pitting blade and spaced laterally therefrom, a vertical cutting blade operating above said pitting blade, a foot mounted alongside said cutting blade and arranged to engage the top surface of said fruit adjacent the cutting blade.

2. In a fruit pitting machine having a rotary pitting blade, lateral fruit clamping means mounted on opposite sides of said pitting blade and spaced laterally therefrom, a vertical cutting blade mounted above said pitting blade, means for moving said cutting blade, a presser foot mounted alongside said cutting blade and operated by said moving means, means for automatically adjusting said presser foot with respect to the cutting edge of said cutting blade, and means for locking said foot in adjusted position.

3. In a fruit pitting machine having a rotary pitting blade, a cutting blade mounted above said pitting blade, means for moving said cutting blade, a foot mounted alongside said cutting blade and resiliently engaged by said moving means, and a pawl mounted on a fixed pivot and arranged to hold said foot in operative position and adapted to be released by the movement of said cutting blade.

4. In a fruit pitting machine having a rotary pitting blade, a slotted plunger having a cutting blade mounted therein above said pitting blade, a foot mounted alongside said plunger and resiliently engaged thereby, a ratchet rack on said foot, a pawl mounted on a fixed pivot between said plunger and foot and adapted to engage said rack and the slot in said plunger.

5. In a fruit pitting machine having a rotary pitting blade, fruit clamping means mounted on opposite sides of said pitting blade and spaced laterally therefrom, a cutting blade mounted above said pitting blade, operating means for moving said blade, a foot mounted alongside said cutting blade and operatively engaged by said operating means and arranged to engage the surface of the fruit adjacent the cutting blade, and means for locking said foot in engagement with the fruit.

6. In a fruit pitting machine having a rotary pitting blade, a movable beam mounted above said pitting blade, clamping means mounted on said beam on opposite sides of said pitting blade and spaced laterally therefrom, a slotted plunger having a cutting blade mounted therein and slidably mounted in said beam, means for moving said plunger relative to said beam, a foot mounted in said beam alongside said plunger and resiliently engaged thereby, a ratchet rack on said foot, a pawl pivoted on said beam and held in inoperative position by engaging the side of said plunger and released into engagement with said rack by entering said slot when said plunger is moved.

WILLIAM O. AWA.
CHARLES KLEMME.